April 8, 1941.  J. W. MILNER  2,237,357
GRAINING MACHINE FOR MOLDING
Filed Dec. 17, 1938  3 Sheets-Sheet 1
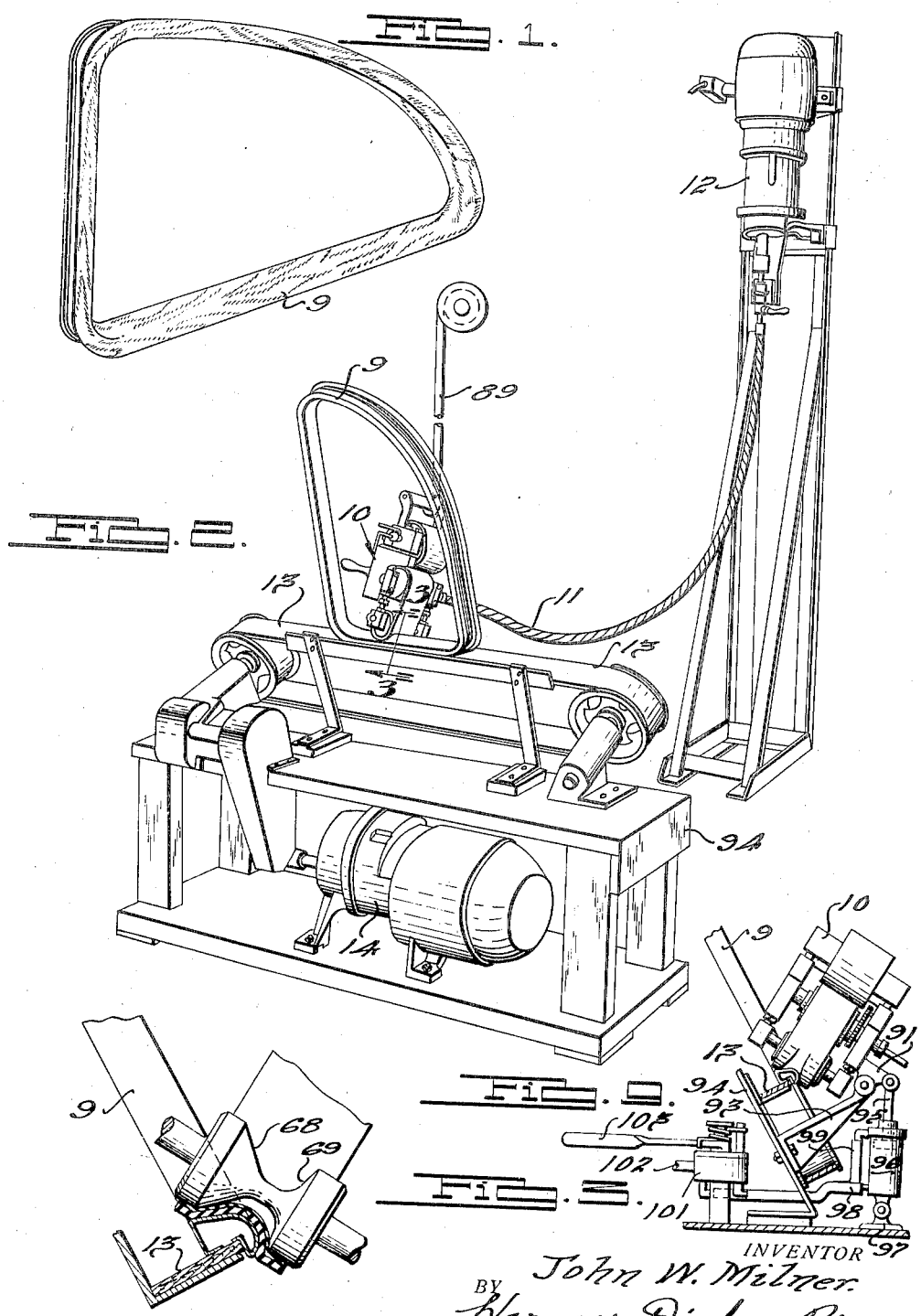
INVENTOR
John W. Milner.
BY Harness, Dickey & Pierce.
ATTORNEYS

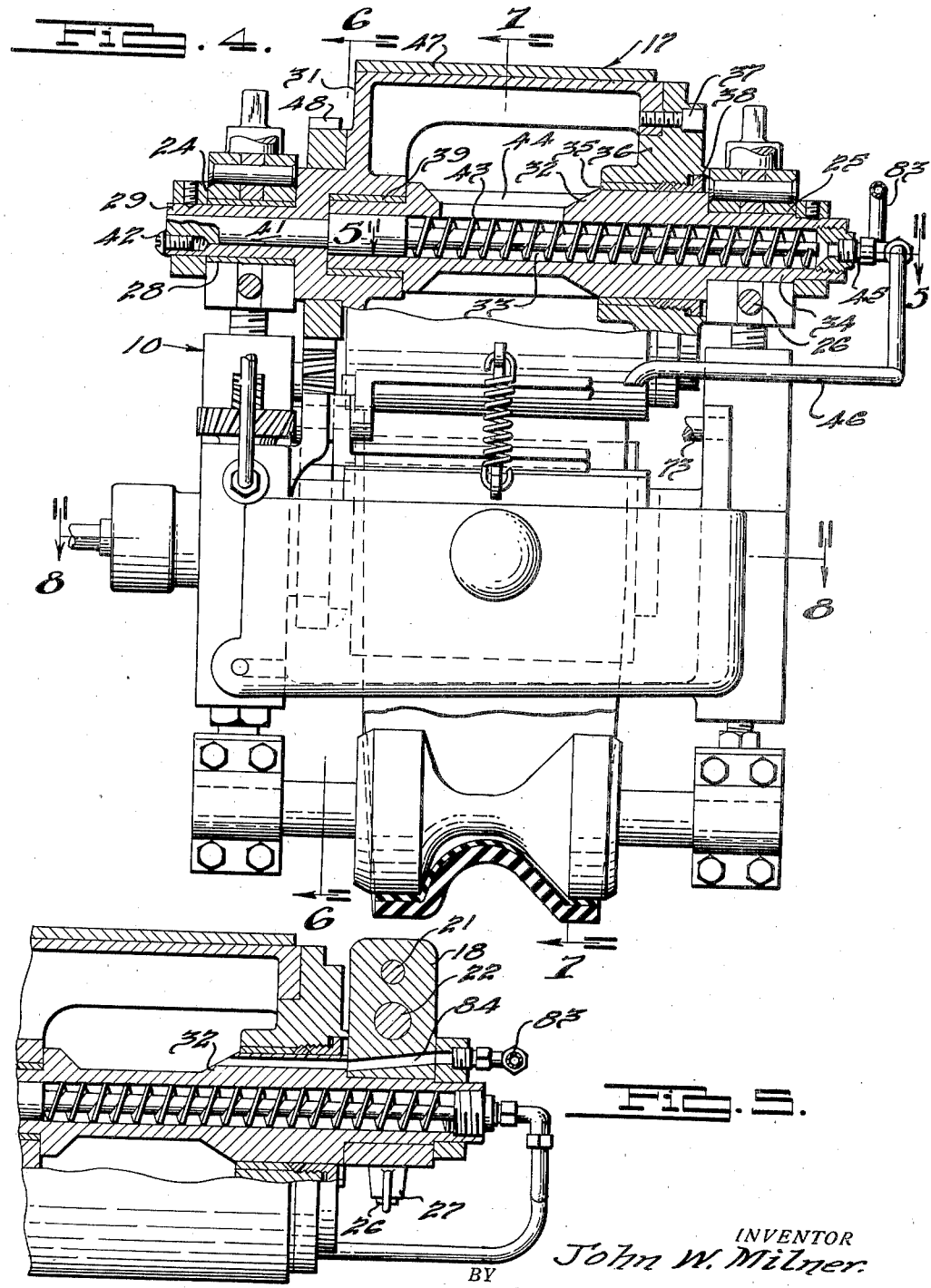

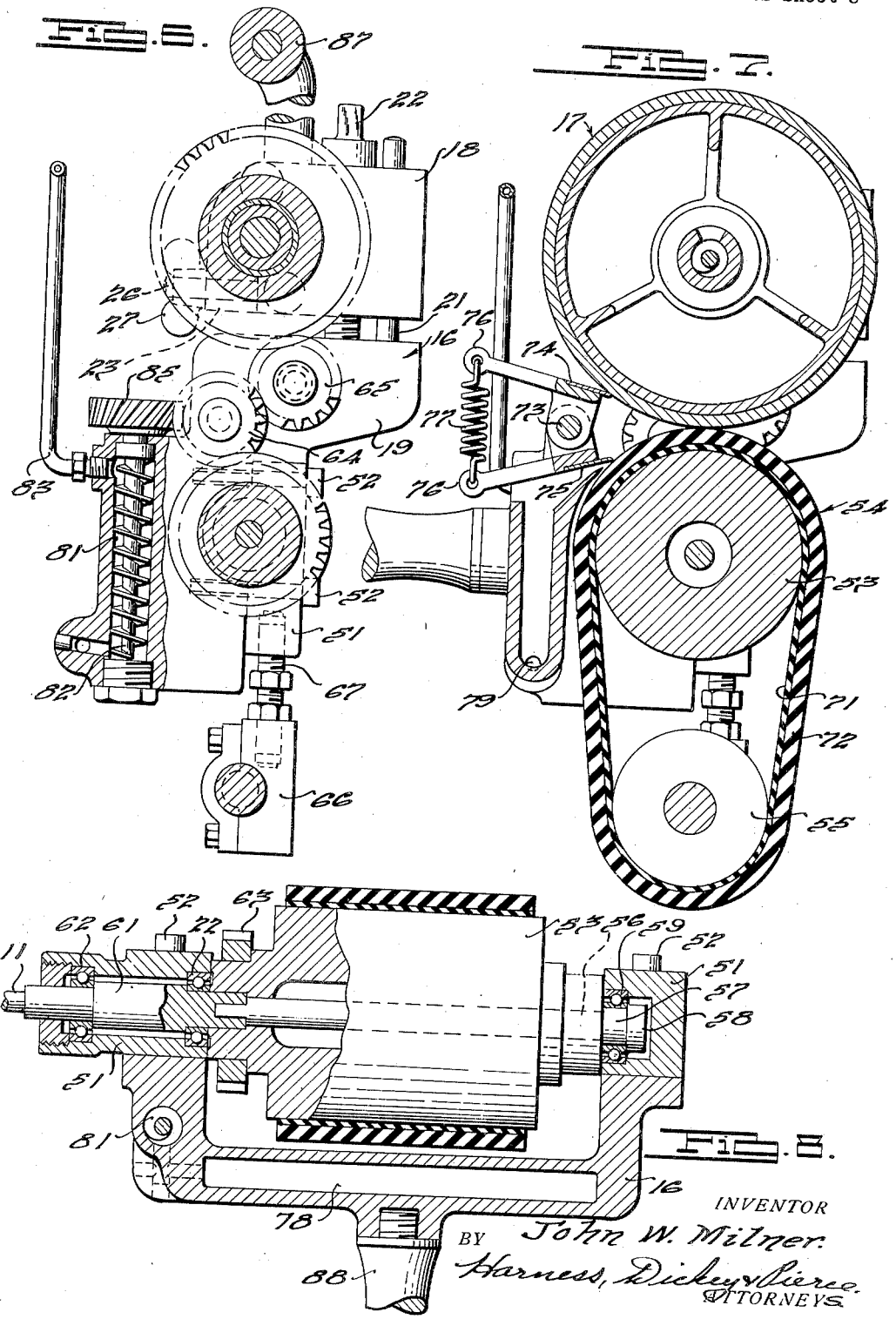

Patented Apr. 8, 1941

2,237,357

UNITED STATES PATENT OFFICE 2,237,357

GRAINING MACHINE FOR MOLDING

John W. Milner, Detroit, Mich., assignor to The Murray Corporation of America, Detroit, Mich., a corporation of Delaware Application December 17, 1938, Serial No. 246,341

12 Claims. (Cl. 101—154)

My invention relates to graining devices, and particularly to a small, compact graining machine of unique construction alone and in combination with driving means therefor and for the workpiece to be grained.

Various methods heretofore have been employed for graining continuous moldings such as the garnish molding for vehicle windows, one employing a hand application of the graining roll first on the face and thereafter on the inwardly presenting surface of the molding. Another construction employed a device having a transfer roll, the end of which was unsupported so that it would deflect to grain the inwardly presenting and the outer surfaces of the molding in a single operation. While the various known methods produced a grain appearance to the moldings, usually touching up operations were required to prevent the lapping of the grain characteristic produced in different operations from being too apparent and when the graining was attempted in a single operation to touch up portions not satisfactorily grained.

In practicing my present invention, I utilize a small, compact machine, having a transfer belt so disposed relative to a backing roll as to have the belt conform to the shape of the cross section of the molding to have the graining characteristics applied to the inner and outer surface of the molding in a single continuous operation. The molding is preferably tilted at an angle and driven by a continuous belt upon which it is disposed. The backing roller for the transfer belt is so constructed as to permit the graining machine to be tilted relative to the molding when contacting the entire surface which is to be grained to eliminate any interference between the molding and device. As the graining belt is driven, the molding is advanced relative thereto on the continuous belt upon which the corners roll at the point of contact with the graining belt as the graining operation progresses.

The graining machine is of unique construction, having a hollow graining roll, the interior of which forms a reservoir for the ink which is applied to the outer surface of the roll. A shaft having a thread of predetermined lead extends through the graining roll and is turned therewith about a central core to advance the ink within the roll out of the end of the core from which it is conducted directly onto the surface of the roll. A doctor blade spreads the ink over the surface of the roll and forces the ink into the interstices of the graining characteristics while scraping it from the plane surfaces therebetween. The ink is collected in a second reservoir along with the ink drained from the scraper blade which dresses the graining belt. The ink collected in the second reservoir is pumped back into the hollow interior of the graining roll.

The pair of backing rolls for the graining belt are preferably mounted as a unit in brackets which permit the rolls and the belt to be quickly removed from the main frame for repair or belt renewal. Suitable gears are provided for driving one of the backing rolls and the graining roll in timed relation, driven from a flexible shaft from a variable speed reduction unit by which the speed of operation of the machine is regulated. The driving of the graining machine and the continuous belt for supporting a workpiece is synchronized to have the surface to be grained and the transfer belt of the machine travel at the same surface speeds.

Accordingly, the main objects of my invention are to grain the inner surface of a continuous molding in a single continuous operation; to advance a molding on a continuously moving belt and drive a transfer belt contacting the surface of the molding to be grained in timed relation therewith; to provide a compact graining machine which may be fixed to a support or hand operated, embodying a graining roll and a transfer belt having the backing roll thereof so shaped as to permit the belt to conform to the curved cross-sectional surface of the workpiece; to force the ink disposed within the hollow graining roll from the end of the support therefor and deliver it from a conduit directly onto the surface of the roll; to deliver ink from a conduit directly to a graining roll and spread the ink over the entire surface of the roll by a doctor blade which prepares the surface for transfer to a roll or belt; to provide a graining machine having a graining roll in contact with a transfer belt which is supported on a pair of spaced rollers, one of which is driven in synchronism with the graining roll; to provide a pair of rolls for supporting a belt in a graining machine in contact with a graining roll forming a unit which may be removed without interfering with the mechanism of the machine; to provide a worm shaft for advancing the ink from the hollow interior of a graining roll and deliver the ink to the surface of the roll from which it is collected in a reservoir and returned by a similar worm shaft to the interior of the hollow roll; and in general, to provide a graining machine which is simple in construction, compact in form, and positive in operation.

Other objects and features of novelty of my invention will be either specifically pointed out or will become apparent when referring, for a better understanding of my invention, to the following description taken in conjunction with the accompanying drawings, wherein:

Figure 1 is a perspective view of a garnish molding which may be grained in a graining device embodying my invention;

Fig. 2 is a perspective view of the graining machine garnish molding and the driven mechanism therefor forming a combination embodying my invention;

Fig. 3 is an enlarged broken sectional view of the structure illustrated in Fig. 2, taken on the line 3—3 thereof;

Fig. 4 is an enlarged broken sectional view of the graining machine illustrated in Fig. 2;

Fig. 5 is an enlarged broken sectional view of the structure illustrated in Fig. 4, taken on the line 5—5 thereof;

Fig. 6 is a sectional view of the structure illustrated in Fig. 4, taken on the line 6—6 thereof;

Fig. 7 is a sectional view of the structure illustrated in Fig. 4, taken on the line 7—7 thereof;

Fig. 8 is a broken sectional view of the structure illustrated in Fig. 4, taken on the line 8—8 thereof, and Fig. 9 is a reduced sectional view of structure, similar to that illustrated in Fig. 2, showing a modified form thereof.

While I have illustrated a garnish molding in Figure 1, as being the element to be grained by my device and method, it is to be understood that other types of workpieces of curved cross-section, either continuous or having spaced ends, may be grained thereby.

In Fig. 2, I have illustrated a graining machine 10, driven by a flexible drive shaft 11 from a variable speed reduction unit 12 of conventional form. The workpiece 9 rests upon a continuous belt 13 driven by a speed reduction unit 14 synchronized to have the surface of the workpiece 9 to be grained move at the same speed as the graining belt or roll of the machine 10 in contact therewith. As illustrated in Fig. 3, the belt 13 is disposed at an angle to have the plane of the workpiece 9 positioned at an angle to the vertical while being advanced by the belt to permit the machine to be disposed at an angle outside of the belt when graining the surface thereof. This avoids any interference between the workpiece and the device when small or irregular workpieces are to be grained.

In Figs. 4 to 8, inclusive, the graining machine 10 is illustrated in detail and will now be described. A U-shaped frame 16 forms the main support for the various elements which go to make up my unique graining device. A graining roll 17 is supported on end brackets 18 attached to the side walls 19 of the casting 16 on pins 21 and adjusting screws 22 by which the brackets 18 are positioned relative to the side walls 19. The end brackets 18 have pivoted caps 23 thereon forming a bearing support 24 on the left hand side of the machine, as illustrated in Fig. 4, and a clamp 25 on the right hand side thereof. Pivoted studs 26 are carried by the brackets having thumb screws 27 thereon by which the bearing is held in position and by which suitable pressure is applied to the clamp 25. A bearing shell 28 is carried in the bearing clamp 24 in which a tubular end portion 29 on the body 31 of the graining roll 17 is journaled for rotational movement.

A core 32 in the nature of a fixed shaft has a hollow interior 33 and a reduced end portion 34 disposed in the clamp 25 and fixed relative thereto through the adjustment of the thumb nut 27 on the stud 26. A bearing shell 35 is disposed on the body of the core 32 over which a spider 36 is disposed in position to rotate thereon. Screws 37 secure the spider to the base 31 of the graining roll 17. A packing gland 38 is provided on the spider 36 for sealing the spider to the core 32 to prevent the ink from passing through the bearing upwardly between the core and spider. A bearing shell 39 is also provided between the opposite end of the core 32 and the body 31 of the graining roll.

A shaft 41 extends through the end 29 of the base 31 of the graining roll being fixed thereto by a screw 42. The shaft has a worm thread 43 thereon which functions as a driving element or pump to advance the fluid from the graining roll 17 out through the spider 32 at the right hand end of the device as illustrated in Fig. 4. The core 32 is provided with slot 44 at the top for the admission of the printing ink into the space between the worm threads 43 of the shaft 41. The ink is forced through the couplings 45 and a conduit 46 from which it flows directly to the outer surface of the graining belt 47 which is secured to the body 31 of the graining roll. A gear 48 is secured to the body portion 31 of the graining roll 17 and keyed or otherwise secured thereto for driving the roll and the shaft 41 relative to the fixed core 32 disposed centrally of the graining roll.

Upon the lower portion of the side walls 19 of my graining machine, a pair of brackets 51 are secured by bolts 52. The brackets, as illustrated in Fig. 8, support a roll 53 for backing a transfer belt 54 relative to the graining roll 17. A second roll 55 forms an additional support for the belt 54 which it backs adjacent to the surface of the workpiece. The brackets 51 are removable from the base casting 16 so that the belt and the two backing rolls may be removed as a unit and repaired or a new belt applied thereto and attached to my graining machine without interfering with other parts thereof or their adjustment. The backing roll 53 is provided with a central shaft 56 having a shoulder 57 and head 58 on one end. A ball bearing 59 is disposed on the shoulder portion 57 retained in position by the head 58. The opposite end of the shaft 56 has a driving connection with the shaft 61 journaled in the opposite bracket 51. The shaft 61 is supported on suitable bearings 62 and forms a support for one end of the backing roll 53 and a means to which the flexible shaft 11 is attached for driving the shaft 61 and therefore the roll 53. The roll 51 has a gear 63 keyed or otherwise secured thereto for driving through a pair of additional gears 64 and 65 for driving the gear 48 and therefore the graining roll 17. Bearing brackets 66 are carried on studs 67 in the lower end of the brackets 51 to support the backing roll 55 which may be adjusted relative to bracket 51 for regulating the tension on the belt 54.

The roller 55 is reduced in diameter at its central portion having a sloping surface 68 disposed at substantially 45 degrees relative to the axes of the roll and an opposite side 69 disposed at an angle substantially 60 degrees relative to the roller axes. This particular sloping of the recess portion of the roller permits the belt to assume a shape conforming to the contour of the graining belt while providing a proper degree of tilt to the graining machine relative to the plane of the workpiece. The belt has a web portion 71 of predetermined strength in contact with the backing rolls 53 and 55 on the surface of which a layer of soft rubber 72 is secured for receiving the ink characteristics from the graining roll 17 and transferring such characteristics to the workpiece. Through the adjustment of the screws 22, the proper degree of pressure is provided between the graining roll 17 and the surface of the rubber 72 of the belt 54.

Crosswise of the frame a shaft 73 is fixed for supporting a doctor blade 74 and a scraper blade 75, as illustrated in Fig. 7. The blades have extending arms 76 interconnected by a spring 77 which provides the proper degree of tension to the blades for acting on the surface of the plate 47 and the transfer belt 54. The springs may be independently secured to the blades and frame to provide individual tension to the two blades.

The casting 16 on the web interconnecting the side walls 19 is provided with a recess or well 78 extending beyond the ends of the blades 74 and 75 for receiving the ink scraped from the roll and belt. An aperture 79 is provided in the lower part of the well communicating with an aperture 81 in the casting in which a worm shaft 82 is disposed to function as a pump for returning the collected ink from the well 78 through a conduit 83 into the hollow interior of the graining roll 17 through a passageway 84 provided in the bracket 18 and the core 32. A helical gear 85 is connected to the end of the shaft 82 in mesh with the idler gear 64 which is of mating helical form.

Accordingly, through the operation of the flexible shaft 11, the backing roll 53 is driven to drive the belt 54 and backing roll 55 and to drive the gear 63. The gear 63 drives the idler gears 64 and 65 to drive the gear 48 which drives the graining roll 17. The idler gear 64 drives the gear 85 to operate the worm shaft 82 to force the ink from the reservoir 78 into the hollow interior of the graining roll 17. A handle 87 may be provided on the top of the machine connected to the brackets 18 and an additional handle 88 may extend from the web of the casting 16. When operating the machine manually, a cable 89, attached to a winding drum or to a weight, may be secured to the machine to support the weight thereof so that an operator is only required to control the position of the machine relative to the workpiece when performing a graining operation.

By having the brackets 18 adjustable relative to the casting 16, the graining roll 17 is adjusted relative to the belt 54 to provide the desired pressure therebetween and to permit graining rolls of different diameters to be employed. Similarly, brackets 66 are adjustable on the supports 51 to provide the proper tension to the belt 54 and to compensate for belts and backing rolls 55 of different shapes and dimensions.

In Fig. 9, I have illustrated the graining machine 10 as being provided with a bell crank type of bracket 91, having one arm pivoted to a bracket 93 carried on the framework 94 which supports the belt 13. Another arm on the bracket has one end of a piston rod 95 pivoted thereto, the other end being secured to a piston disposed in a cylinder 96. The cylinder 96 has its end pivoted on a bracket 97 to permit a slight oscillation thereto. Flexible conduits 98 and 99 connect opposite ends of the cylinder 96 to a valve 101 to which fluid is conducted by a conduit 102. The valve is actuated by a spring pressed lever 103, preferably disposed in a position to be moved by the leg of the operator. The graining machine 10 is thereby so supported on the bracket 93 that through the actuation of the lever 103, the piston rod 95 rocks the machine on its pivot to and from contact with the molding 9. A single operator retains the molding on the belt and aids in turning the molding at the corners as the belt 13 advances in synchronism with the belt 54 of the graining machine 10 which is in contact with the molding.

At the end of the graining operation the lever 103 is released, reversing the flow of fluid in the cylinder 96 to have the graining machine 10 moved away from the molding. The molding is then removed and a new molding applied to the belt 13 at which time lever 103 is again moved to reverse the flow of fluid in the cylinder 96 to cause the graining machine 10 to again move into contact with a molding.

The graining machine which I have invented is especially small and compact while being exceedingly rugged and capable of continuous operation. The machine may be manipulated manually and may be counterweighted on a cable to relieve the operator from supporting the machine. Preferably, the machine is pivotally mounted to relieve the operator from handling the machine and to more accurately position the machine on the moldings. By shaping the work backing roll for the belt to a desired contour, any cross-section of workpiece may be grained by my unique graining machine. The machine being compact, the transfer belt is small and the cost of renewal is materially reduced. To renew the belt, it is only necessary to remove the brackets supporting the belt backing rollers and the rollers and belt are removed as a unit without interfering with other parts of the machine or their adjustment.

While I have described and illustrated but a single embodiment of my invention, it will be apparent to those skilled in the art that various changes, omissions, additions, and substitutions may be made therein without departing from the spirit and scope of my invention, as set forth in the accompanying claims.

What I claim is:

1. A graining machine including, in combination, a frame, a graining roll journalled in said frame, a transfer belt, a pair of rolls, means for supporting said rolls and belt independently of said frame, a driven gear on said frame, a gear to be driven on one of said pair of rolls, and means for attaching said support to said frame with the belt in contact with said graining roll and said gears in driving relation.

2. A graining machine including, in combination, a frame, a graining roll journalled in said frame, a transfer belt, a pair of rolls over which said belt is driven, a support for said pair of rolls, mated gears for driving said graining roll and the adjacent of said pair of rolls, releasable means attaching said supporting means to said frame with the gears in mated relation, and means carried by said supporting means for adjusting said other of the pair of rolls relative to said adjacent roll.

3. A graining machine including, in combination, a frame, a hollow graining roll, the interior of which forms a reservoir for ink, a fixed hollow core on which the roll is journalled, a worm shaft connected to said graining roll and projecting through said core, said core having an opening communicating with said worm shaft, and means for driving said graining roll and worm.

4. A graining machine including, in combination, a frame, a hollow graining roll, the interior of which forms a reservoir for ink, a fixed hollow core on which the roll is journalled, a worm shaft connected to said graining roll and projecting through said core, said core having an opening communicating with said worm shaft, means for driving said graining roll and worm, and a conduit through which the ink is forced by said worm shaft for conducting the ink onto the exterior of said roll.

5. A graining machine including, in combination, a frame, a hollow graining roll, the interior of which forms a reservoir for ink, a fixed hollow core on which the roll is journalled, a worm shaft connected to said graining roll and projecting through said core, said core having an opening communicating with said worm shaft, means for driving said graining roll and worm shaft, a conduit through which the ink is forced by said worm for conducting the ink on to the exterior of said roll, transfer means contacting said graining roll, and doctor and scraper blades contacting the roll and transfer means respectively, all of which is carried by said frame.

6. A graining machine including, in combination, a frame, a hollow graining roll, the interior of which forms a reservoir for ink, a fixed hollow core on which the roll is journalled, a worm shaft connected to said graining roll and projecting through said core, said core having an opening communicating with said worm shaft, means for driving said graining roll and worm shaft, a conduit through which the ink is forced by said worm for conducting the ink on to the exterior of said roll, transfer means contacting said graining roll, doctor and scraper blades contacting the roll and transfer means respectively, and a reservoir for receiving the ink from both of said blades, all of which is carried by said frame.

7. A graining machine including, in combination, a frame, a hollow graining roll, the interior of which forms a reservoir for ink, a fixed hollow core on which the roll is journalled, a worm shaft connected to said graining roll and projecting through said core, said core having an opening communicating with said worm, means for driving said graining roll and worm shaft, a conduit through which the ink is forced by said worm for conducting the ink on to the exterior of said roll, transfer means contacting said graining roll, doctor and scraper blades contacting the roll and transfer means respectively, a reservoir for receiving the ink from both of said blades, and means for delivering the ink in said reservoir to the interior of said graining roll.

8. A graining machine including, in combination, a U-shape frame, a unit embodying spaced backing rolls encompassed by a belt releasably attachable as a unit to said frame, a graining roll adjustably mounted on top of said frame toward and away from said belt, and means for supplying ink to the surface of said graining roll, all of which is supported by said frame.

9. A graining machine including, in combination, a U-shape frame, a unit embodying spaced backing rolls encompassed by a belt and releasably attachable to said frame, a graining roll having a continuous cylindrical surface adjustably mounted on top of said frame to be movable toward and away from said belt, the interior of said graining roll being hollow forming a reservoir for ink, and means for delivering the ink from the interior of said roll to the exterior surface thereof, all of which is supported by said frame.

10. A graining machine including, in combination, a U-shape frame, a unit embodying spaced backing rolls encompassed by a belt and releasably attachable to said frame, a graining roll having a continuous cylindrical surface adjustably mounted on top of said frame to be movable toward and away from said belt, the interior of said graining roll being hollow forming a reservoir for ink, means for delivering the ink from the interior of said roll to the exterior surface thereof, a doctor blade and a scraper blade contacting the roll and belt respectively, and a reservoir for receiving the surplus ink from said blades, all of which is supported by said frame.

11. A graining machine including, in combination, a U-shape frame, a unit embodying spaced backing rolls encompassed by a belt and releasably attachable to said frame, a graining roll having a continuous cylindrical surface adjustably mounted on top of said frame to be movable toward and away from said belt, the interior of said graining roll being hollow forming a reservoir for ink, means for delivering the ink from the interior of said roll to the exterior surface thereof, a doctor blade and a scraper blade contacting the roll and belt respectively, a reservoir for receiving the surplus ink from said blades, and means for delivering the ink from the reservoir to the interior of said graining roll, all of which is supported by said frame.

12. A graining machine including, in combination, a frame, a hollow graining roll having a continuous cylindrical surface mounted on said frame and forming a reservoir for ink, transfer means in contact with said roll, and means for applying ink from the interior of said roll to the exterior face thereof.

JOHN W. MILNER.